US011157971B1

(12) United States Patent
Isgar

(10) Patent No.: US 11,157,971 B1
(45) Date of Patent: *Oct. 26, 2021

(54) CHARITY DONATION SYSTEM

(71) Applicant: Charles Isgar, Scottsdale, AZ (US)

(72) Inventor: Charles Isgar, Scottsdale, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/664,763

(22) Filed: Oct. 25, 2019

Related U.S. Application Data

(63) Continuation-in-part of application No. 15/996,368, filed on Jun. 1, 2018, now Pat. No. 10,504,160.

(51) Int. Cl.
G06Q 30/02 (2012.01)
H04W 4/021 (2018.01)
G06Q 20/32 (2012.01)

(52) U.S. Cl.
CPC ....... G06Q 30/0279 (2013.01); G06Q 20/325 (2013.01); G06Q 20/327 (2013.01); H04W 4/021 (2013.01)

(58) Field of Classification Search
CPC ............. G06Q 30/0279; G06Q 20/327; G06Q 20/325; H04W 4/021
See application file for complete search history.

(56) References Cited

U.S. PATENT DOCUMENTS

| 6,092,052 | A | 7/2000 | Ziarno |
| 8,018,329 | B2 | 9/2011 | Morgan et al. |
| 8,653,956 | B2 | 2/2014 | Berkobin et al. |
| 9,191,217 | B2 | 11/2015 | Martell |
| 9,437,085 | B1 | 9/2016 | Rempe et al. |
| 9,710,821 | B2 | 7/2017 | Heath |
| 10,504,160 | B1* | 12/2019 | Isgar ...................... H04W 4/021 |
| 2004/0122682 | A1 | 6/2004 | Gruber et al. |
| 2006/0026056 | A1 | 2/2006 | Weiner et al. |
| 2010/0010886 | A1* | 1/2010 | Flynn, Jr. ............. G06Q 20/322 705/14.15 |
| 2012/0078762 | A1* | 3/2012 | Valin .................. G06Q 30/0231 705/30 |
| 2012/0254032 | A1 | 10/2012 | Carbonell |

(Continued)

OTHER PUBLICATIONS

"NCR and Krispey Kreme Digitize the Salvation Army's Red Kettle Christmas Campaign via Mobile App" Press Release/Investor Relations/NCR Sep. 28, 2018.

(Continued)

Primary Examiner — Dennis W Ruhl
(74) Attorney, Agent, or Firm — Schmeiser, Olsen & Watts LLP

(57) ABSTRACT

A charitable donation system is provided. The system includes a computer server having a memory storing charitable organization data and user data, a collection device coupled to the computer server, and a user computing device coupled to the computer server. The system establishes a proximity zone around the collection device. When a user computing device enters the proximity zone, a connection between the server and the user computing device is established. The computer server may be programmed to receive from the user computing device a signal activating a donation, the signal including user data and donation data, including a user identifying information and a donation amount. The computer server may be programmed to process the payment and account for the donation amount.

13 Claims, 9 Drawing Sheets

(56) References Cited

U.S. PATENT DOCUMENTS

| | | |
|---|---|---|
| 2013/0018705 A1 | 1/2013 | Heath et al. |
| 2013/0254107 A1 | 9/2013 | McClure |
| 2013/0268440 A1* | 10/2013 | Tierney ............... G06Q 20/342 705/44 |
| 2014/0235166 A1 | 8/2014 | Molettiere et al. |
| 2014/0304187 A1 | 10/2014 | Menn |
| 2015/0019432 A1 | 1/2015 | Burns |
| 2015/0120553 A1 | 4/2015 | Li |
| 2015/0142688 A1 | 5/2015 | Jackson et al. |
| 2015/0154667 A1 | 6/2015 | Hicks et al. |
| 2016/0088449 A1 | 3/2016 | Sharma |
| 2016/0098696 A1 | 4/2016 | Sundaram |
| 2016/0247144 A1 | 8/2016 | Oh et al. |
| 2016/0323812 A1 | 11/2016 | Moon |
| 2016/0349984 A1 | 12/2016 | Ding |
| 2017/0032354 A1 | 2/2017 | Tilahun |
| 2017/0098210 A1 | 4/2017 | Laracey et al. |
| 2018/0181928 A1 | 6/2018 | Woo |
| 2021/0166279 A1* | 6/2021 | Louw ..................... H04W 4/80 |

OTHER PUBLICATIONS

"Recent Advances in Wireless Indoor Localization Techniques and System" Journal of Computer Networks and Communications vol. 2013 (2013), Article ID 185138, 12 pages.

"Salvation Army Ponders Cashless Kettle as Digital Donations Increase." Chicago Tribune Dec. 19, 2017.

Isgar, Charles, Charity Donation System, Patent Cooperation Treaty Application Serial No. PCT/US19/35253, Filed Jun. 3, 2019, International Search Report and Written Opinion dated Aug. 16, 2019.

\* cited by examiner

CHARITY DONATION SYSTEM

CROSS REFERENCE TO RELATED APPLICATION[S]

This application is a continuation-in-part of the earlier U.S. Utility Patent Application entitled "CHARITY DONATION SYSTEM," Ser. No. 15/996,368, filed Jun. 1, 2018, the disclosure of which is hereby incorporated entirely herein by reference.

BACKGROUND OF THE INVENTION

Technical Field

This invention relates generally to a charitable contribution system, and more particularly to a system for providing electronic contributions to charitable organizations and verification of valid charitable organizations.

State of the Art

Charitable organizations historically have various ways of collecting donations. For example, one way is to have an employee or volunteer collecting cash and coins operating a collection container inside or outside of a business, like a grocery store, department store and the like. In these instances, people with spare change or cash can deposit money into the container. This has significant drawbacks, such as theft of the donations, fewer donations as more and more people do not carry cash, lack of verification of the collection container really being associated with a charitable organization, and the like.

Accordingly, there is a need for an improved system for collecting charitable money donations.

DISCLOSURE OF THE INVENTION

The present invention relates to a charitable donation system that verifies the charitable organization as legitimate and allows for electronic donations from a plurality of users. Additionally, the invention relates to a system that provides an easy form of giving to verified charitable organizations without the use of cash.

An embodiment includes a charitable donation system comprising: a computer server having a memory storing charitable organization data and user data; a collection device coupled to the computer server; and a user computing device coupled to the computer server, the computer server programmed to: receive from the collection device a signal that the collection device is active and ready to accept donations and automatically generate and send for auto-execution instructions to establish a proximity zone around the collection device; receive a signal from the collection device that a user computing device of the system has entered the proximity zone; automatically establish a connection between the server and the user computing device in response to the user computing device entering the proximity zone; automatically generate and send for display on the user computing device a donation interface that includes at least one donation activation button; receive from the user computing device a signal activating a donation in response to selection of the at least one donation activation button on the user computing device, the signal including user data and donation data, including a user identifying information and a donation amount; and automatically process the signal and send a communication to the user computing device to acknowledge receipt of the donation amount.

Another embodiment includes a charitable donation system comprising: a computer server having a memory storing charitable organization data and user data; a plurality of collection devices coupled to the computer server; and a user computing device coupled to the computer server, the computer server programmed to: receive from each of the plurality of collection devices a signal that each of the plurality of collection devices are active and automatically generate and send for auto-execution instructions to establish a proximity zone around each of the plurality of collection devices; receive a signal from one or more of the plurality of collection devices that a user computing device of the system has entered the proximity zone of the one or more of the plurality of collection devices; automatically establish a connection between the server and the user computing device in response to the user computing device entering the proximity zone of the one or more of the plurality of collection devices; automatically generate and send for display on the user computing device a charity interface that includes a list of charities associated with the one or more of the plurality of collection devices entered by the user computing device in a period of time; receive from the user computing device a signal with charity information corresponding to a selected charity from the list of charities; in response to receiving the signal with charity information, automatically generate and send for display on the user computing device a donation interface that includes at least one donation activation button; receive from the user computing device a signal activating a donation in response to selection of the at least one donation activation button on the user computing device, the signal including user data and donation data, including a user identifying information and a donation amount; and automatically process the signal and send a communication to the user computing device to acknowledge receipt of the donation amount.

Yet another embodiment includes a charitable donation system comprising: a computer server having a memory storing charitable organization data and user data; a plurality of collection devices coupled to the computer server; and a user computing device coupled to the computer server, the computer server programmed to: receive from each of the plurality of collection devices a signal that each of the plurality of collection devices are active and automatically generate and send for auto-execution instructions to establish a proximity zone around each of the plurality of collection devices; receive a signal from one or more of the plurality of collection devices that a user computing device of the system has entered the proximity zone of the one or more of the plurality of collection devices; automatically establish a connection between the server and the user computing device in response to the user computing device entering the proximity zone of the one or more of the plurality of collection devices; automatically generate and send for display on the user computing device a charity interface that includes a list of charities associated with the one or more of the plurality of collection devices entered by the user computing device in a period of time; receive from the user computing device a signal with charity information corresponding to a selected charity from the list of charities; in response to receiving the signal with charity information, automatically generate and send for display on the user computing device a donation interface that includes at least one donation activation button; receive from the user computing device a signal activating a donation in response to selection of the at least one donation activation button on the user computing device, the signal including user data and donation data, including a user identifying information and a donation amount; and automatically process the signal and send a communication to the user computing device to acknowledge receipt of the donation amount.

The foregoing and other features and advantages of the present invention will be apparent from the following more detailed description of the particular embodiments of the invention, as illustrated in the accompanying drawings.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF EMBODIMENTS OF THE INVENTION

As discussed above, embodiments of the present invention relate to a charitable donation system that provides for electronic donations and verification that the charitable organization is legitimate. Additionally, the invention relates to a system that provides an easy form of giving to verified charitable organizations without the use of cash. This is particularly relevant as the general population carries less cash and therefore has less cash to provide to charitable organizations at donation locations.

Figure 1A:
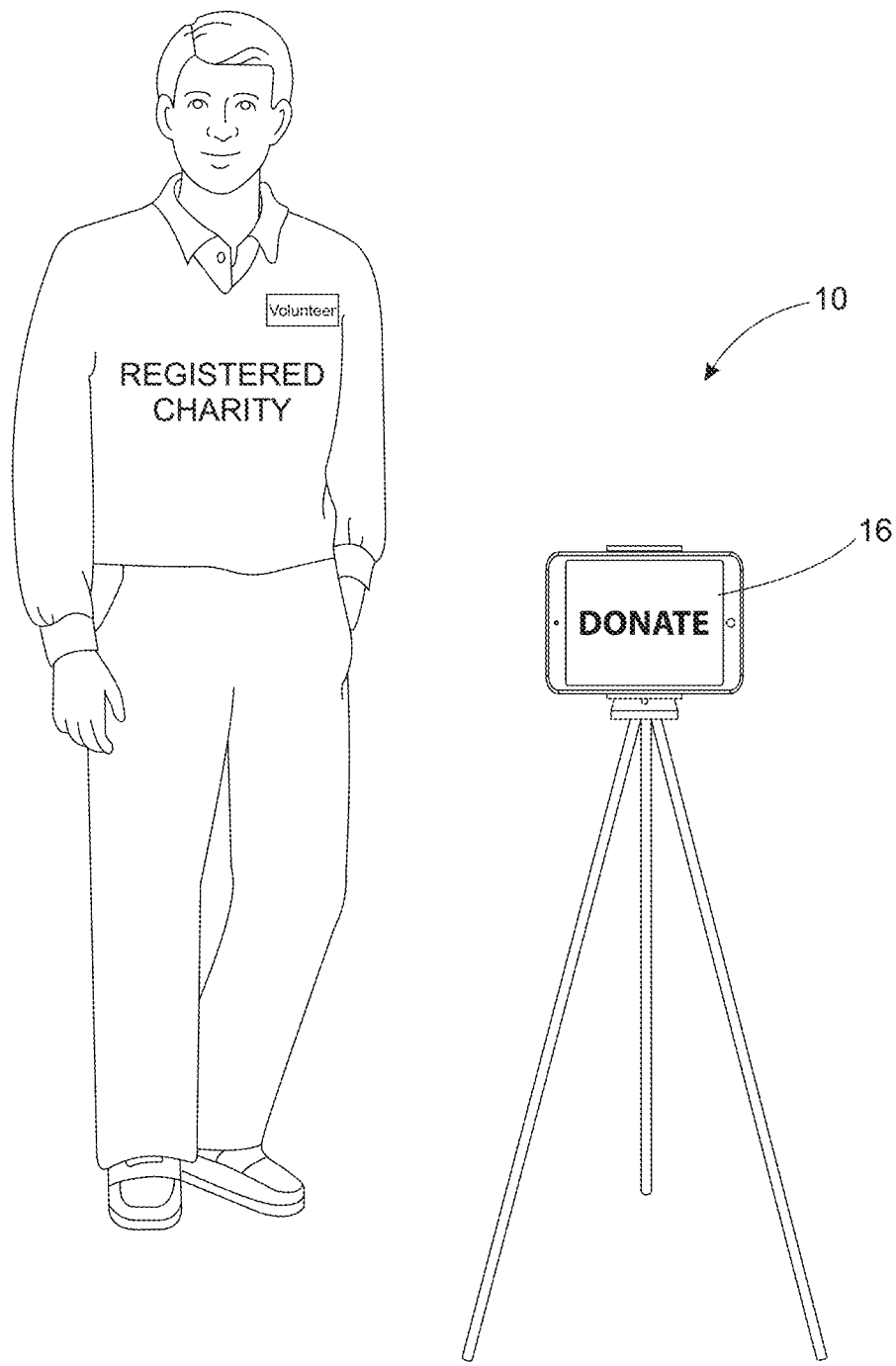
FIG. 1A is a view of a charity donation system in accordance with an embodiment.

Referring to the drawings, FIG. 1 depicts an embodiment of a charitable donation system 10. The system 10 may include user computing devices 12, a computer server 14, and a collection device 16, wherein the user computing devices 12 and the collection device 16 are coupled to the computer server 14. This coupling may be a network connection, such as through an Internet connection, wherein the user computing devices 12 and the collection device 16 may communicate with and receive communication from the server 14.

In embodiments, the collection device may be, without limitation, a smartphone or a tablet for electronic donations, or a container with smart electronics or with a smartphone or a tablet coupled to a container for operation within the system while also allowing for cash and electronic donations. In embodiments where there is a tablet, smart phone or the like, the system 10 may include an application that operates on the device in order to communicate with the server 14. In these embodiments, activating the collection device 16 may include operating the app on the tablet or smartphone.

Figure 4:
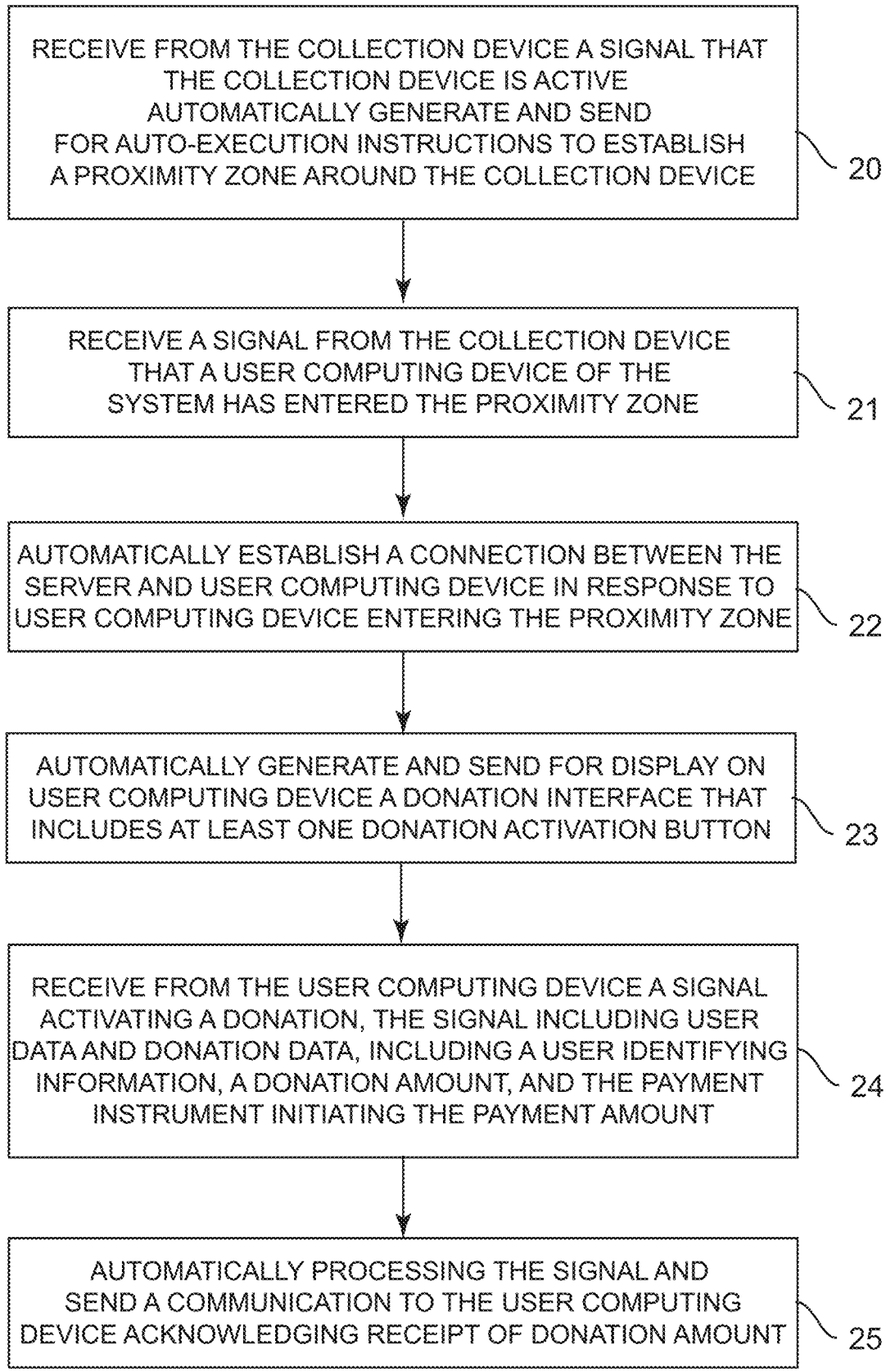
FIG. 4 is a flow chart of programmed steps of a computer server of a charity donation system in accordance with an embodiment.

The computer server 14 may include a memory storing charitable organization data corresponding to various charitable organizations and user data. The charitable organization data includes verification information that the charitable organizations are legitimate, display information, bank account information and the like. The user data may include name, contact information including address, email and phone number and payment account information for effecting a donation, and the like. A user computing device 12 and collection device 16 may be coupled to the computer server 14, and, referring additionally to FIG. 4, the computer server 14 may be programmed to receive from the collection device 16 a signal that the collection device 16 is active and automatically generate and send for auto-execution instructions to establish a proximity zone 18 around the collection device (Step 20); receive a signal from the collection device 16 that a user computing device 12 of the system has entered the proximity zone 18 (Step 21); automatically establish a connection between the server and the user computing device in response to the user computing device entering the proximity zone 18 (Step 22); automatically generate and send for display on the user computing device 12 donation interface that includes at least one donation activation button (Step 23); receive from the user computing device a signal activating a donation, the signal including user data and donation data, including a user identifying information and a donation amount (Step 24); and automatically process the signal and send a communication to the user computing device to acknowledge receipt of the donation amount (Step 25).

The proximity zone 18 may be a predetermined size, such as a radius or space around the collection device. The size of the proximity zone 18 may be determined by the type of collection device and the charitable organization employing the collection device. The proximity zone 18 may include, but is not limited to a geofence, an NFC zone, a Wi-Fi signal quadrant, such as a 5G Wi-Fi signal quadrant, or any other means of establishing a proximity zone.

Figure 1B:
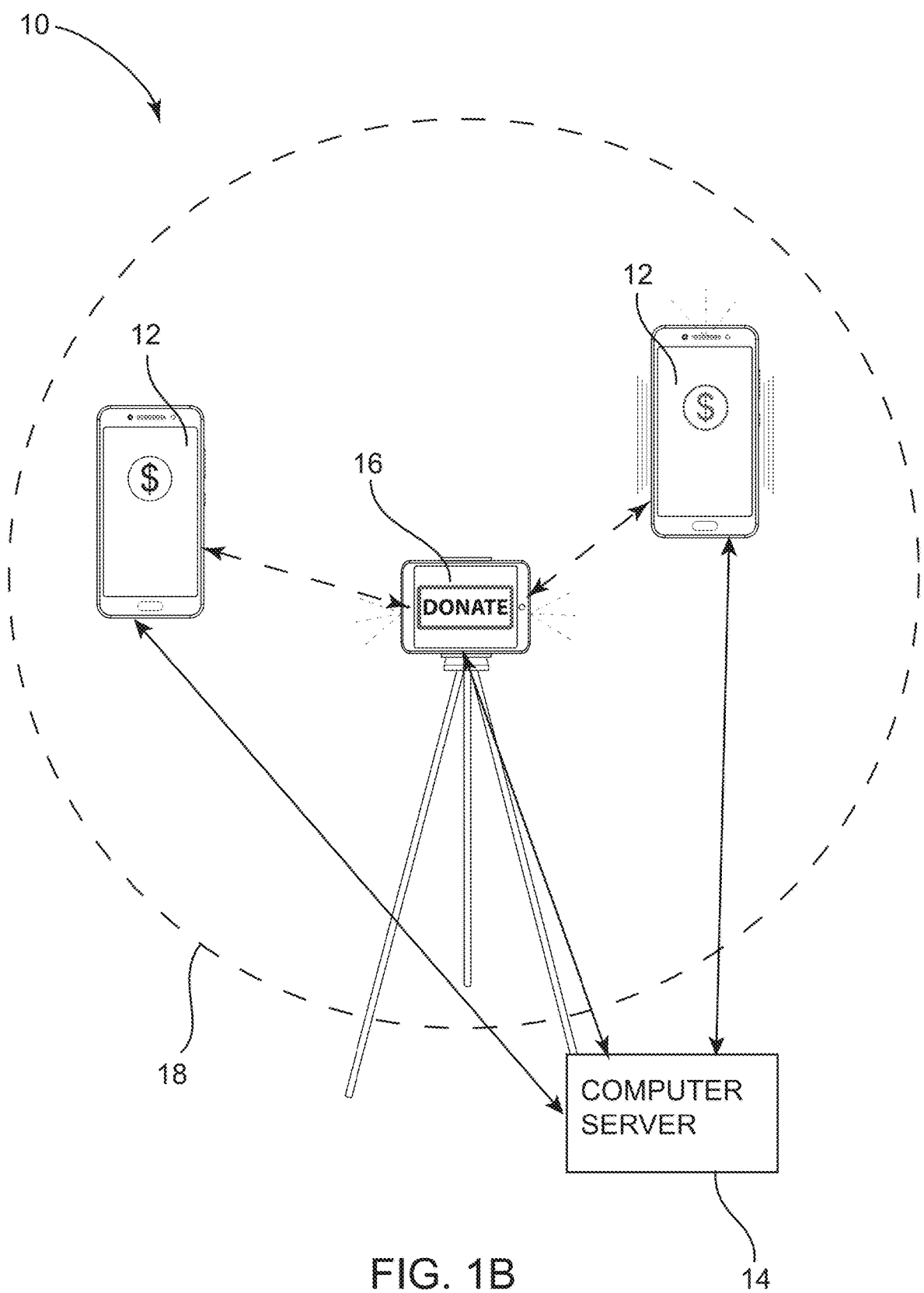
FIG. 1B is a diagrammatic view of a charity donation system in accordance with an embodiment.

The collection device may include visual and/or audio alerts to signify a donation has been made (as shown in FIG. 1B). This may be a light and/or sound that will alert the user performing the donation that the collection device 16 has received the donation information.

The computer server 14 may further be programmed to verify the charitable organization as legitimate and communicate the verification to the user computing device 12 in response to the user computing device accessing the system within the proximity zone 18. Further still, the computer server 14 may be programmed to verify or otherwise confirm that the collection device 16 is legitimately associated with the charitable organization. In some embodiments, the computer server 14 is further programmed to automatically verify the charitable organization as legitimate and communicate the verification to the user computing device 12 in response to the user computing device 12 entering the proximity zone 18. A charitable organization may register with the system 10, and the system may verify the charitable organization as legitimate and store the verification in memory on the server. When the charitable organization operates the system, the server 14 may store in its memory an identification of one or more collection devices 16 that is/are assigned to the charitable organization. Accordingly, the computer server 14 may be programmed to access its memory to determine or verify if the charitable organization associated with the collection device(s) 16 is legitimate and to verify that the collection device 16 is legitimately associated with the charitable organization, wherein the server 14 receives an identification of the collection device(s) 16 when the device(s) 16 are activated and confirms that the identification of activated collection device(s) 16 is assigned to the charitable organization. In at least this way, there is a two-step verification of verifying the charitable organization as legitimate and verifying that the collection device 16 is associated or assigned to that legitimate charitable organization.

The computer server may then be programmed to transfer donations to a bank account of the charitable organization. The system may retain a predetermined amount from the total donation amount as a cost for processing the donations and for utilization of the system. This may be automated upon deactivation of the collection device.

Additionally, the computer server 14 may be programmed to automatically account for the donations made utilizing the system 10 by the same user through a user computing device 12. The computer server 14 may be programmed to automatically store in its memory, donation information associated with the user, wherein the donation information may include the charitable organization, the amount of the donation, and the date of the donation. The computer server 14 may be programmed to automatically generate tax documentation of all charitable donations made by the user over a calendar year itemized by charitable organization amount and dates of donations to be used by the user in preparing tax returns.

In other embodiments, the computer server may be further programmed to receive from the user computing device a signal activating a donation, the signal including user data and donation data, including a user identifying information and a pledged amount; and automatically process the pledged amount and generate an invoice for the pledged amount for sending from the charitable organization to the user. The invoice may be delivered through any means to the user, such as an email, a notice to the user computing device 12 and the like.

The collection device 16 may further be programmed to verify the charitable organization as legitimate and communicate the verification to the user computing device in response to the user computing device accessing the system within the proximity zone 18. In some embodiments, the collection device 16 is further programmed to automatically verify the charitable organization as legitimate and communicate the verification to the user computing device in response to the user computing device entering the proximity zone 18. A charitable organization may register with the system, and the system may verify the charitable organization as legitimate and store the verification in memory on the server. Accordingly, the computer server may be programmed to access its memory to determine if the charitable organization associated with the collection device is legitimate.

Figure 2A:
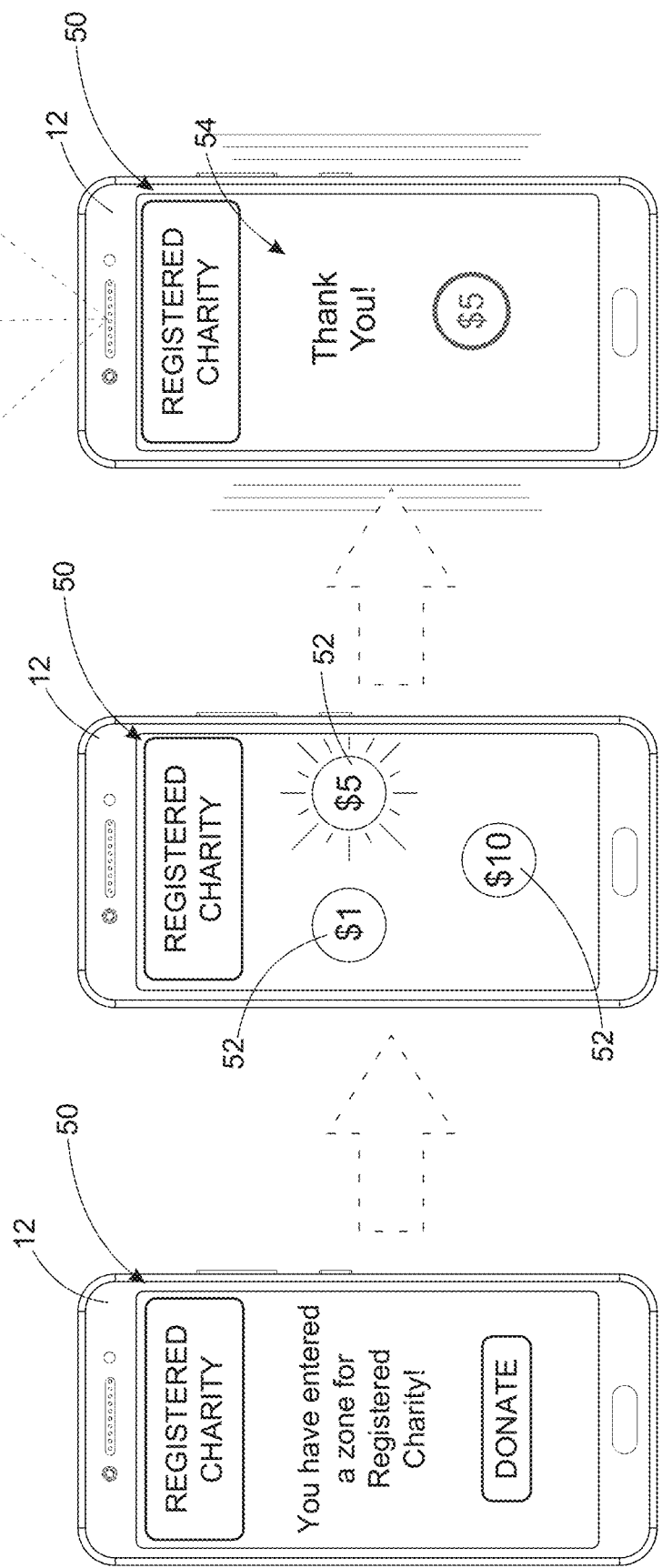
FIG. 2A is a view of a mobile computing device operating as part of a charity donation system in accordance with an embodiment.

Referring again to the drawings, FIG. 2A depicts an activation of a donation in accordance with an embodiment. In embodiments, as the mobile computing device 12 enters the proximity zone around the collection device 16, the server 14 may be programmed to automatically generate and send for display on the user computing device 12 a donation interface 50 that includes an invitation to donate. The invitation to donate may be engaged by a user within or without the proximity zone. For example, a user may pass through the proximity zone and receive the invitation to donate in the user computing device 12. The user may then leave the zone and to a car, or in a store or wait until the user is home, or the like and then engage the user interface and select a donate button 51. Selecting the donate button 51 directs the user to another page of the donation interface having at least one donation activation button 52. Each activation button 52 may be for a different amount or for a custom amount. For example, and without limitation, the activation buttons 52 displayed on the donation interface 50 may include an amount of $1, $5, $10, and a Custom amount. The server may be programmed to receive from the user computing device 12 a signal activating a donation in response to selection of the at least one donation activation button 52 (such as the $5 button in FIG. 2B) on the user computing device 12. The signal may include user data and donation data, including a user identifying information and a donation amount. The server 14 may further be programmed to automatically process the signal and send a communication to the user computing device to acknowledge receipt of the donation amount, such as a confirmation interface 54 shown in FIG. 2A that may also include an audible, a visual and/or a tactile confirmation of the donation.

Figure 2B:
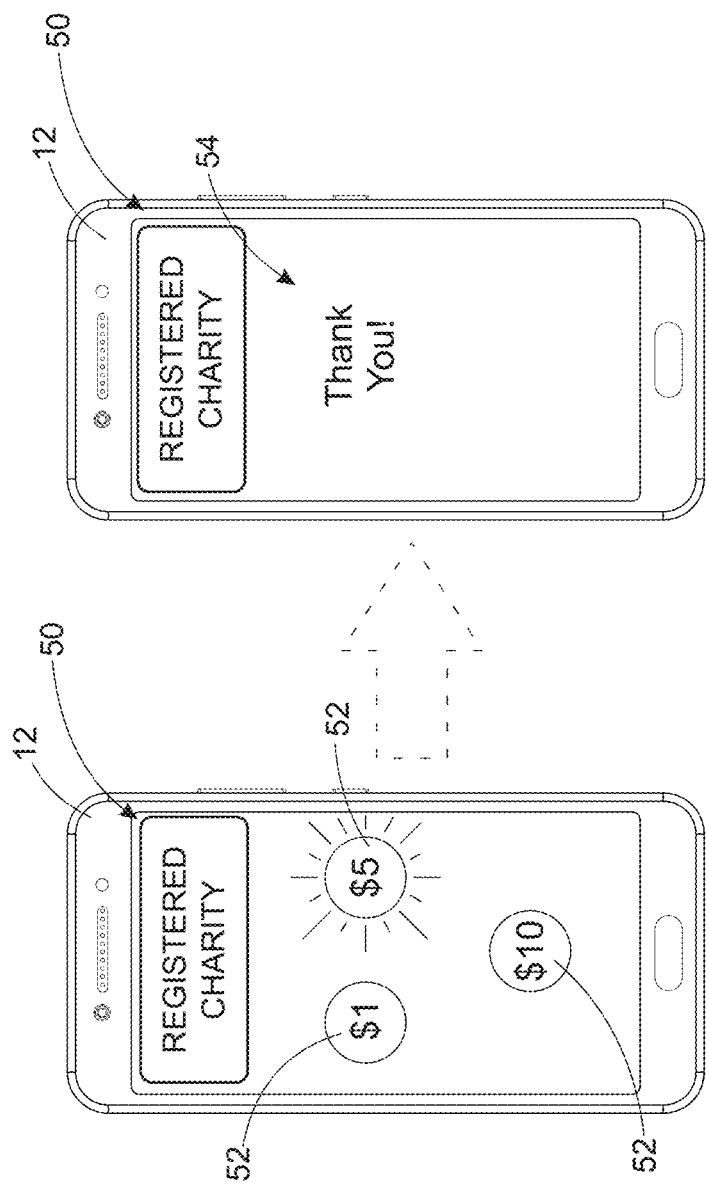
FIG. 2B is a view of a mobile computing device operating as part of a charity donation system in accordance with an embodiment.

Referring again to the drawings, FIG. 2B depicts an activation of a donation in accordance with an embodiment. In embodiments, as the mobile computing device 12 enters the proximity zone around the collection device 16, the server 14 may be programmed to automatically generate and send for display on the user computing device 12 a donation interface 50 that includes at least one donation activation button 52. Each activation button 52 may be for a different amount or for a custom amount. For example, and without limitation, the activation buttons 52 displayed on the donation interface 50 may include an amount of $1, $5, $10, and a Custom amount. The server may be programmed to receive from the user computing device 12 a signal activating a donation in response to selection of the at least one donation activation button 52 (such as the $5 button in FIG. 2B) on the user computing device 12. The signal may include user data and donation data, including a user identifying information and a donation amount. The server 14 may further be programmed to automatically process the signal and send a communication to the user computing device to acknowledge receipt of the donation amount, such as a confirmation interface 54 shown in FIG. 2B that may also include an audible, a visual and/or a tactile confirmation of the donation.

In embodiments, the donation data sent by the user computing device 12 to the server 14 in response to selecting the activation button 52 may include a donation amount associated with the activation button requiring confirmation prior to processing the donation amount. The server 14 may further be programmed to send verification instructions to the user computing device in response to receiving and processing the donation data. The verification instructions may be a text message, an email, a user interface displayed on the user computing device or the like. The verification instructions may provide instructions, a link, a button or other form of sending a verification of the pledged donation amount. The verification may include verifying that the user intended to donate the pledged amount and the charitable organization to which the user intended to donate. Additionally, the server 14 is further programmed to initiate payment of the donation amount utilizing a payment instrument stored in the user data corresponding to the user identifying information, in response to receiving verification of the pledged donation amount.

In some embodiments, the action of selecting an activation button 52 as depicted in FIG. 2B may occur within the proximity zone 18 of the collection device 12. In other embodiments, the user computing device 12 may automatically establish a connection with the server 14 for communication to be sent between the user computing device 12 and the server 14 in response to the user computing device 12 entering the proximity zone 18. Once that connection is established, the donation interface 50 may be sent for display on the user computing device 12. That, as shown occurs when the user computing device 12 is within the proximity zone. The selection of the donation activation button 52 may occur within or outside of the proximity zone 18. In embodiments where the selection of the donation activation button 52 occurs outside of the proximity zone, it will be understood that connection with the server and display of the donation interface occurs within the proximity zone and the donation process may be completed outside of the proximity zone. In at least this way, the proximity zone triggers the donation process without the need of the user remain within the proximity zone and allowing the user to still donate using the system 10 after leaving the proximity zoned area.

Figure 3A:
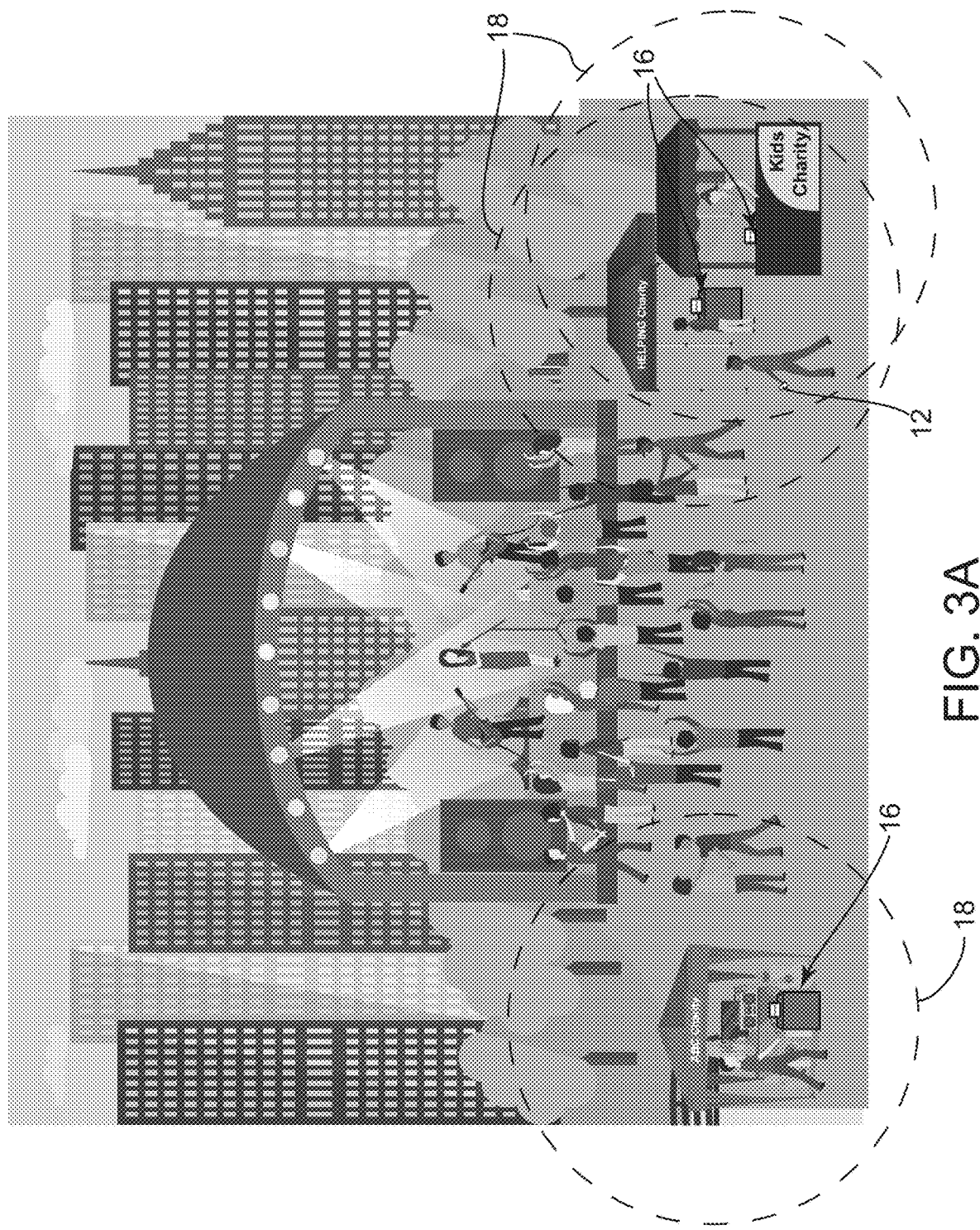
FIG. 3A is a view of multiple charities/businesses operating a charity donation system in accordance with an embodiment.

Referring to FIGS. 3A-3D, another embodiment of the system 10 may be employed. As shown in FIG. 3A several charities/businesses may employ the system 10 by having separate collection devices 16 associated with different charities, such as, ABC Charity, HELPING Charity and Kids charity as depicted in FIG. 3A. The user computing device 12 operated by a user may pass through multiple proximity zones associated with the various charities. As can be seen, the proximity zones can overlap, and the system is still functional to alert the user computing device 12 and queue up alerts on the user computing device 12. Accordingly, as the user passes from proximity zone to proximity zone regardless if they overlap alerts are queued up on the user computing device 12.

Figure 3B:
FIG. 3B is a view of a user computing device operating at a location remote from the proximity zones depicted in FIG. 3A in accordance with an embodiment.
Figure 3C:
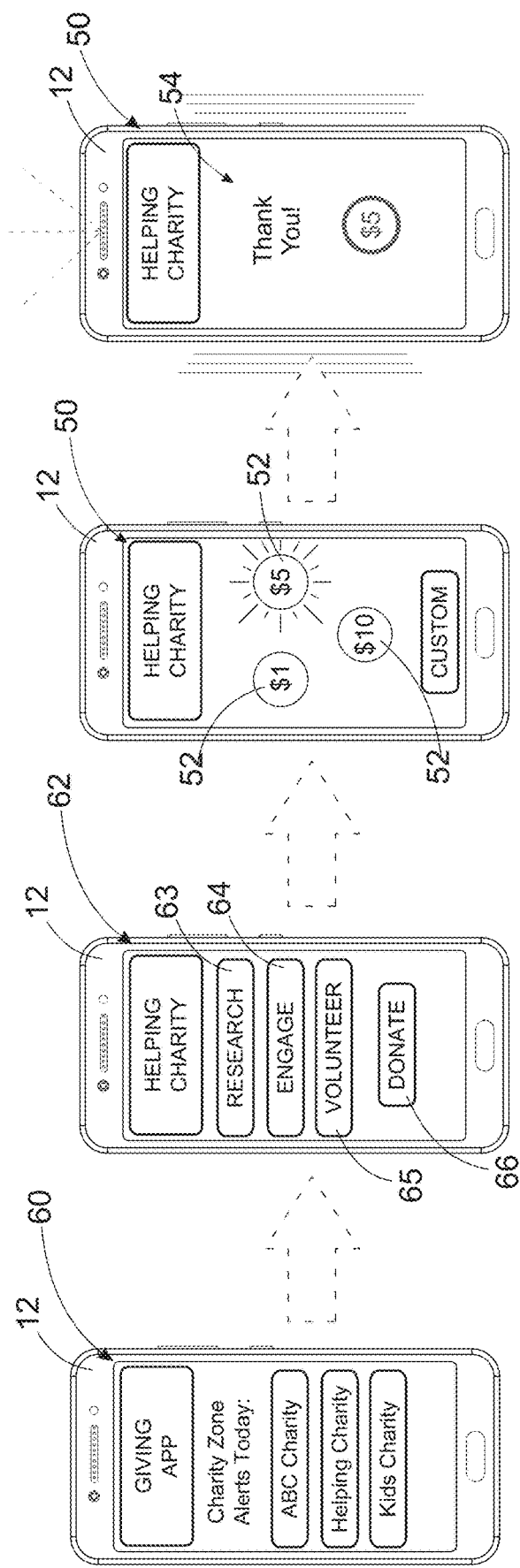
FIG. 3C is a view of a mobile computing device operating as part of a charity donation system that has received notifications from the multiple charities/businesses as depicted in FIG. 3A in accordance with an embodiment.

Then when a user leaves the zone, he or she may access the list of charities associated with proximity zones on the user computing device 12, such as a user's home as shown in FIG. 3B. The user computing device 12 in FIG. 3C may include a charity interface 60 depicting a list of charities, each charity having a button associated with it, the charities associated with the proximity zones the user passed through. The user may select a certain charity button and be directed to a second charity interface 62 having several optional buttons, such as a research button 63 selectable to be directed to information about the charity, an engage button 64 for engaging in communication with the charity, a volunteer button 65 for signing up to volunteer to assist the charity, and a donate button 66 to proceed to donate. The selection of the donate button 66 results in the server 14 operating programmed instructions to automatically generate and send for display on the user computing device 12 a donation interface 50 that includes at least one donation activation button 52. Each activation button 52 may be for a different amount or for a custom amount. For example, and without limitation, the activation buttons 52 displayed on the donation interface 50 may include an amount of $1, $5, $10, and a Custom amount. The server may be programmed to receive from the user computing device 12 a signal activating a donation in response to selection of the at least one donation activation button 52 (such as the $5 button in FIG. 3C) on the user computing device 12. The signal may include user data and donation data, including a user identifying information and a donation amount. The server 14 may further be programmed to automatically process the signal and send a communication to the user computing device to acknowledge receipt of the donation amount, such as a confirmation interface 54 shown in FIG. 3C that may also include an audible, a visual and/or a tactile confirmation of the donation.

Figure 3D:
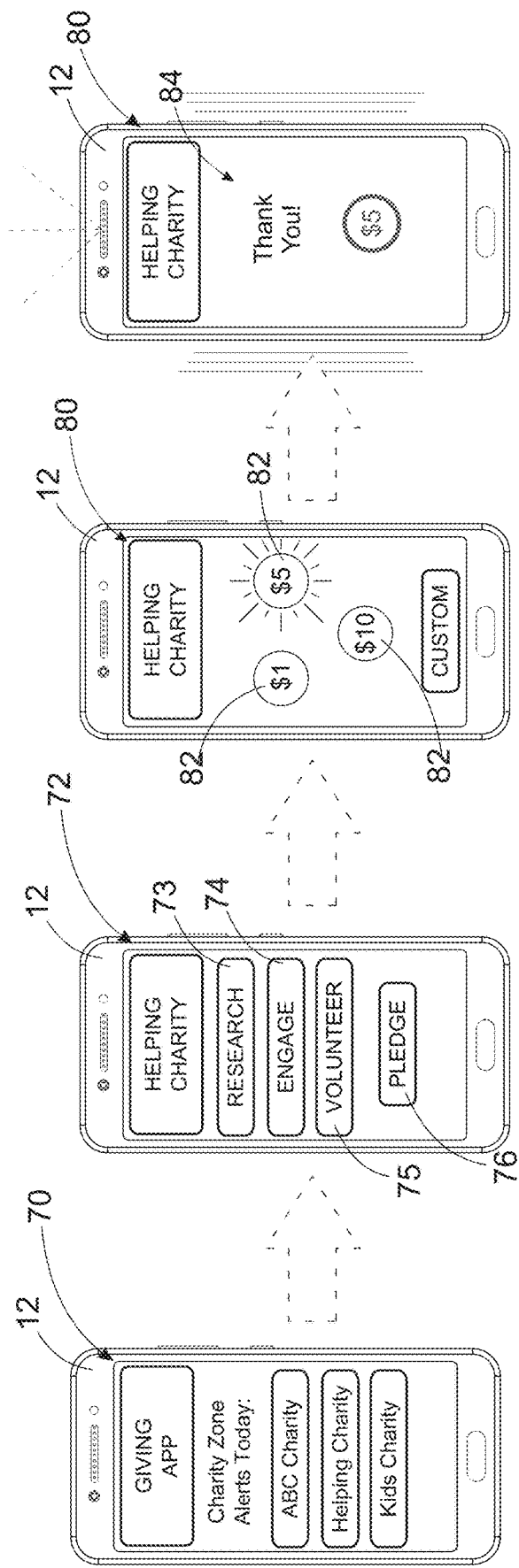
FIG. 3D is a view of a mobile computing device operating as part of a charity donation system that has received notifications from the multiple charities/businesses as depicted in FIG. 3A in accordance with an embodiment.

In another embodiment depicted in FIG. 3D, when a user leaves the zone, he or she may access the list of charities associated with proximity zones on the user computing device 12, such as a user's home as shown in FIG. 3B. The user computing device 12 in FIG. 3D may include a charity interface 70 depicting a list of charities, each charity having a button associated with it, the charities associated with the proximity zones the user passed through. The user may select a certain charity button and be directed to a second charity interface 72 having several optional buttons, such as a research button 73 selectable to be directed to information about the charity, an engage button 74 for engaging in communication with the charity, a volunteer button 75 for signing up to volunteer to assist the charity, and a pledge button 76 to proceed to pledge an amount to donate. The selection of the pledge button 76 results in the server 14 operating programmed instructions to automatically generate and send for display on the user computing device 12 a pledge interface 80 that includes at least one pledge activation button 82. Each activation button 82 may be for a different amount or for a custom amount. For example, and without limitation, the activation buttons 82 displayed on the pledge interface 80 may include an amount of $1, $5, $10, and a Custom amount. The server may be programmed to receive from the user computing device 12 a signal activating a pledge in response to selection of the at least one pledge activation button 82 (such as the $5 button in FIG. 3D) on the user computing device 12. The signal may include user data and donation data, including a user identifying information and a donation amount. The server 14 may further be programmed to automatically process the signal and send a communication to the user computing device to acknowledge receipt of the donation amount, such as a confirmation interface 84 shown in FIG. 3D that may also include an audible, a visual and/or a tactile confirmation of the pledge. While it has been depicted in FIG. 3D that the user computing device can produce a list of charities, in some embodiments, the user computing device when entering a proximity zone 18, may immediately display a pledge interface 80 and the system 10 operates as described from that point on above.

In the embodiment of FIG. 3D, the pledge data sent by the user computing device 12 to the server 14 in response to selecting the activation button 82 may include a pledge amount associated with the activation button requiring confirmation prior to processing payment of the pledge amount. The server 14 may further be programmed to send verification instructions to the user computing device 12 in response to receiving and processing the pledge data. The verification instructions may be a text message, an email, a user interface displayed on the user computing device or the like. The verification instructions may provide instructions, a link, a button or other form of sending a verification of the pledged amount. The verification may include verifying that the user intended to donate the pledged amount and the charitable organization to which the user intended to donate. Additionally, in some embodiments, the server 14 is further programmed to initiate payment of the donation amount utilizing a payment instrument stored in the user data corresponding to the user identifying information, in response to receiving verification of the pledged donation amount. In other embodiments, the server 14 may communicate with a third party payment process center that can receive and process payments from all user that have pledged an amount to donate to a charity or business using the system 10.

As can be seen from the embodiments of the system, the system 10 can operate to have a donation performed immediately within the proximity zone, a pledge may be made immediately within the proximity zone, the donation may be made after leaving the proximity zone or otherwise in a location remote from the proximity zone, or may include a list of charities that the user computing device 12 engaged in a period of time for later engagement and donation made. Further, the pledge/donation amount may require a second form of verifying in order for the amount to be sent from the user bank account to the charity of choice.

It should be appreciated that the system 10 operates in a manner that keeps the user information anonymous from the charities that utilize the system 10. The system 10 may be operated by a third party, wherein charities or business register for use of the system 10 and the information of the charities are stored on the system. The charities may then operate an application on a tablet, smartphone or other computing device operating as a collection device 16. The activation of the application associates the collection device 16 and the login information for operating the application can serve as part of the verification process described previously. As shown in FIG. 3A, a user with user computing device 12 may move from proximity zone to proximity zone and the system 10 can send the alert to the user computing device 12 in a one directional push of information to the user computing device 12, either to the device itself or through the application operating the system. This does not need to include the sharing of user information with charity or tracking of location by the charity. In some embodiments, the system 10 may not ever need to share the user's information with the charity and the user can still receive the tax benefit based on documentation provided from the system 10. The system operating in at least this way provides places the movement from anonymous to engaging with the charity in the hands of the user and not a by product of utilizing the system.

Embodiments may be available on or through the internet, such as through domain names reserved and owned by Applicant that include charityping.com, charityinvite.com, givinginvite.com, willugive.com, cashlesscharity.com, charityreminder.com, charitychime.com, girogiving.com or the like.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire-line, optical fiber cable, RF, etc., or any suitable combination of the foregoing.

Computer program code for carrying out operations for aspects of the present invention may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, cloud-based infrastructure architecture, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above without departing from the spirit and scope of the forthcoming claims.

The invention claimed is:

1. A charitable donation system comprising:
a computer server having a memory storing charitable organization data and user data;
a collection device coupled to the computer server; and
a user computing device coupled to the computer server separate from the coupling of the collection device, the computer server programmed to:
receive from the collection device a signal that the collection device is active and automatically generate and send for auto-execution instructions to establish a proximity zone around the collection device;
receive a signal from the collection device that a user computing device of the system has entered the proximity zone;
automatically establish a direct connection between the server and the user computing device separate from the coupling of the collection device with the computer server in response to the user computing device entering the proximity zone;
automatically generate and send for display on the user computing device through the established direct connection between the server and the user computing device a donation interface that includes at least one donation activation button;
receive from the user computing device through the established direct connection between the server and the user computing device a signal activating a donation in response to selection of the at least one donation activation button on the user computing device, the signal including user data and donation data, including a user identifying information and a donation amount; and
automatically process the signal and send a communication to the user computing device through the established direct connection between the server and the user computing device to acknowledge receipt of the donation amount.

2. The system of claim 1, wherein the at least one donation activation button includes a predetermined donation amount associated with selecting the at least one donation activation button.

3. The system of claim 2, wherein the server is further programmed to automatically initiate the donation from the user computing device to the charitable organization associated with the collection device.

4. The system of claim 1, wherein the donation data further includes a pledged donation amount requiring confirmation prior to processing the donation amount.

5. The system of claim 1, wherein the server is further programmed to send verification instructions to the user computing device in response to receiving and processing the donation data.

6. The system of claim 1, wherein the server is further programmed to initiate payment of the donation amount utilizing a payment instrument stored in the user data corresponding to the user identifying information, in response to receiving verification of the pledged donation amount.

7. The system of claim 1, wherein the proximity zone has a predetermined size around the collection device.

8. The system of claim 7, wherein the predetermined size of the proximity zone is determined by the type of collection device and the charitable organization employing the collection device.

9. The system of claim 8, wherein the computer server is further programmed to transfer donations to a bank account of the charitable organization.

10. The system of claim 1, wherein the computer server is further programmed to automatically access memory to confirm that the collection device is legitimately associated with the charitable organization and that the charitable organization associated with the collection device is a legitimate charitable organization.

11. The system of claim 1, wherein the computer server is further programmed to automatically account for the donations made utilizing the system by the user.

12. The system of claim 11, wherein the computer server is further programmed to automatically store in its memory, donation information associated with the user, wherein the donation information includes the charitable organization, the amount of the donation, and the date of the donation.

13. The system of claim 12, wherein the computer server is further programmed to automatically generate tax documentation of all charitable donations made by the user over a calendar year itemized by charitable organization amount and dates of donations to be used by the user in preparing tax returns and transmit the generated tax documentation to the user computing device.

\* \* \* \* \*